2,949,377
TRANSFER COMPOSITION CONTAINING A TRIPHENYLCARBINOL COMPOUND AND PRECIPITATED CALCIUM CARBONATE

David W. Steinhardt, New York, N.Y.; Amos Steinhardt and Franklin A. Goldwater, executors of said David W. Steinhardt, deceased Filed Oct. 30, 1957, Ser. No. 693,418

2 Claims. (Cl. 106—272)

This invention relates to the art of duplicating written or printed matter, and is applicable to what may be called a dry process or solid-to-solid process, and also to what may be called a wet or spirit duplicating process.

An object of the invention is the provision of generally improved and more satisfactory duplicating materials and processes.

Another object is the provision of duplicating materials and processes having less likelihood of smudging and producing undesirable color, than those previously employed in the art.

Still another object is the provision of compounds which are initially colorless or substantially colorless, and are capable of being readily and easily developed to the desired color by appropriate treatment, but which have an unusually high degree of resistance to accidental and unintentional color development such as by handling with the human hands.

A further object of the invention is the provision of such compounds or materials in a form suitable for use as a back coating on an impact duplicating sheet such as a so-called carbonless carbon sheet, and also suitable for use as the active coating of a so-called "master sheet" for a wet process or spirit duplicating process, and also suitable for incorporation or impregnation in a typewriter ribbon or similar printing ribbon, where it is desired to have the initial impression invisible or substantially so, and to have it later developed to a visible color.

Figure 1:
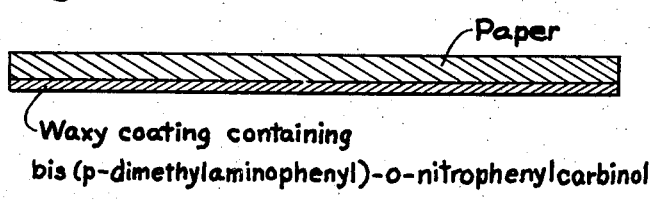
Figure 2:
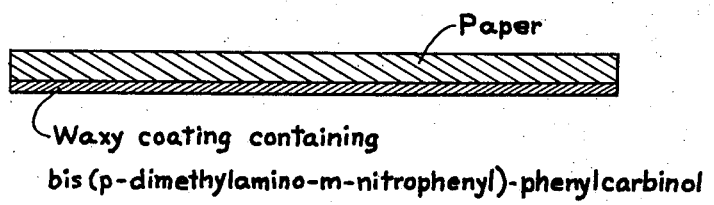

These and other desirable objects may be attained in the manner disclosed as an illustrative embodiment of the invention in the following description and in the accompanying drawings forming a part hereof, in which:

Fig. 1 is a diagrammatic or schematic cross section through a sheet in accordance with one embodiment of the present invention; and Fig. 2 is a similar view illustrating another embodiment of the invention.

The present invention is in some respects an improvement upon the arrangements disclosed in my copending United States patent application, Serial No. 584,397, filed May 11, 1956, now abandoned, which copending application is sometimes hereafter referred to as "said application" or the "prior application."

In said application, I have disclosed the use of a coloring or color-forming agent comprising the carbinol base of malachite green, mixed with wax and with a primary fatty acid amine, and have stated in said application that improved results are obtained if the mixture also contains finely divided calcium carbonate.

As explained in my prior application, the finely divided calcium carbonate apparently helps to carry the wax containing the color-forming agent from the original sheet or surface to the sheet or surface to which it is to be transferred, and increases the brilliance of the coloring of the resulting print and the number of satisfactory copies which can be run.

I have now discovered that far superior results can be attained if, instead of using merely finely divided calcium carbonate, one uses precipitated calcium carbonate. The exact reasons for this are not understood, but it seems to be probably due to the fact that in some way the surfaces of the tiny particles of precipitated calcium carbonate are different from the surfaces of equally small particles of calcium carbonate obtained, e.g., by grinding rather than by precipitation.

As in my previous application, the carbinol base of malachite green is sometimes hereafter referred to as c.b.m.g., for the sake of brevity.

The following examples give a very satisfactory composition of matter for use as a coloring agent for a transfer duplicating process; that is, where the composition of matter is to be transferred by impact or pressure (typewriter key, writing strokes of a pencil or stylus, etc.) from a typewriter ribbon to a sheet of paper, or from the back of one sheet of paper to the face of another sheet, or from the face of one sheet of paper to the back of another sheet to form a "master" sheet for use in a spirit duplicating process, etc.

*Example 1*

A composition is made of the following ingredients thoroughly mixed together and heated until all organics are melted:

| | Grams |
|---|---|
| Carnauba wax | 19.1 |
| Carbinol base of malachite green (c.b.m.g.) | 23.0 |
| Dioctyl phthalate (known also as di-2-ethylhexyl-phthlate and as "DOP") | 13.3 |
| Primary aliphatic amine having a melting point of about 41 degrees C. and a mean molecular weight of its primary amine content of about 262 (available on the market under the name "Armeen TD," made by Armour & Co.) | 13.3 |
| Precipitated calcium carbonate | 30.4 |

This mixture gives very good results when used as a coloring agent for a transfer duplicating process as above mentioned. It readily develops to a brilliant green color of a high tinctorial value, when subjected to a developing agent in the form of a dilute solution of a suitable acid, such as a dilute solution of 2-hydroxy-3-naphthoic acid, as explained in my prior application. The developing agent may be previously incorporated in the sheet of paper to which the composition is transferred by the writing strokes, or may be applied later as in a spirit duplicating process.

*Example 2*

Same as Example 1, except that precipitated barium sulfate is employed in place of the precipitated calcium carbonate of Example 1. Equally good results are secured.

*Example 3*

| | Grams |
|---|---|
| Carnauba wax | 15.0 |
| C.b.m.g. | 23.8 |
| DOP | 17.4 |
| Armeen TD | 13.3 |
| Kieselguhr (known also as diatomite, or as diatomaceous earth) | 3.0 |

It will be noted that in this Example 3, the quantity of c.b.m.g. and the quantity of Armeen TD is the same as in Example 1. A somewhat lesser quantity of carnauba wax has been used, and a somewhat greater quantity of DOP. The exact amounts of these two ingredients are not critical, but may be varied within a reasonable range. It is also noted that kieselguhr is used in the same approximate volumetric quantity as the precipitated calcium carbonate of Example 1, and the precipitated barium sulfate of Example 2. The results appear to be approximately equally good in either case, indicating that there is probably something about the surface characteristics of kieselguhr, precipitated barium sulfate, and precipitated calcium carbonate that makes these materials particularly suitable for a coloring agent composition, giving better results than other equally fine materials which do not have the surface characteristics of these particular materials named in the examples.

Quite likely the beneficial action of the kieselguhr or precipitated calcium carbonate or precipitated barium sulfate may be due to the fact that the surfaces of these materials will more readily sorb the c.b.m.g. In this connection the word sorb is used in a generic sense, meaning either absorb or adsorb, as it is not known at present whether the action is truly an absorbing action or an adsorbing action. Whatever the action may be, it is nevertheless found that the finely divided material of the kind above mentioned seems to retain the c.b.m.g. in a way which considerably decreases the smudging and undesired staining otherwise cause by the mixture, and gives improved transfer from one sheet to another, yet does not interfere with its intended usefulness.

It has further been discovered, as another aspect of the present invention, that the non-smudging and non-staining characteristics of the mixture can be further improved by incorporating a small quantity of a strong non-volatile base, in accordance with the following examples.

Example 4

Same as Example 1 except that 0.5 gram of trishydroxymethylaminomethane is added to each 100 grams of the mixture of Example 1. This additive acts as a strong non-volatile base and makes the mixture more "clean" in normal use; that is, reduces the accidental smudging and staining.

Example 5

Same as Example 2, except that 0.5 gram of trishydroxylmethylaminomethane is added per 100 grams of the mixture. The same improved result noted under Example 4 is attained here.

Example 6

Same as Example 3, except that 0.5 gram of trishydroxymethylaminomethane is added per 100 grams of mixture. The same improvement is obtained.

Example 7

In each of Examples 4, 5, and 6, triethanolamine may be substituted for the trishydroxymethylaminomethane. Substantially the same results are obtained.

In the foregoing examples, although the results as to cleanliness of the mixture are improved in comparison with the prior art and in comparison with the disclosure of my prior application, the results still are not entirely perfect. Some degree of staining or smudging may still occur.

It has been discovered according to another aspect of the present invention, that the results are still further improved, and still greater cleanliness is obtained, if one uses, instead of c.b.m.g., a dye forming or color forming ingredient which is less sensitive to acids; that is, which will require stronger acids to form or develop the desired color, than required with c.b.m.g.

The c.b.m.g. used in the previous examples is somewhat sensitive to even the weak acids found in the human skin, so that there is a tendency to develop color when the composition or mixture comes into accidental contact with the skin. Of course this accidental and undesired development of color is one of the things that workers in the duplicating field or art have been trying to avoid for years, and many proposals have been made, before the present invention, but none of them entirely satisfactory, so far as I am aware. It has been proposed, for example, to use a color forming agent or ingredient which, initially colorless, will not develop to a color by the action of acid alone, but requires treatment with something else, e.g., an oxidizing agent, either preceding or simultaneously with the action of the acid. But the use of an oxidizing agent is undesirable from other standpoints, so cannot be regarded as a completely satisfactory solution to the problem of stain or accidental color formation. I prefer to approach the solution from the standpoint of using a color forming ingredient which will develop by the action of acid alone, so as to eliminate the need for any oxidizing agent or other inflammable or dangerous material, and yet which will be relatively insensitive to the acids of the human skin and to other agents or materials which have tended in the past to cause undesirable smudging and staining of the duplicating materials known in the prior art.

The materials according to the foregoing examples are steps in this direction, and are definite improvements. However, I find that still better results are obtained by departing from the c.b.m.g. material and by using, instead of it, the material of the following example:

Example 8

In any one of the previous Examples 1–7, bis(p-dimethylaminophenyl)-o-nitrophenylcarbinol is substituted in place of the c.b.m.g., which is bis(p-dimethylaminophenyl)-phenylcarbinol.

This example may really be considered as seven different examples, depending on whether the above specified material is substituted in Example 1, Example 2, etc., through Example 7. But in every case, that is, in all seven of these mixtures, improved results are obtained with respect to smudge or staining, in comparison to the original Examples 1 through 7. The substituted material of Example 8 requires a stronger acid to develop the color, and so is less affected by the weak acid present in the human skin or other acids that may be present in the atmosphere or in the paper base to which the mixture is applied.

The bis(p-dimethylaminophenyl)-o-nitrophenylcarbinol may be prepared by any of various known methods, the method used in preparing this material being unimportant so far as the present invention is concerned. For example, it may be prepared by condensing o-nitrobenzaldehyde with dimethylaniline, followed by oxidation and isolation.

The ortho position of the nitro group is important for purposes of the present invention, as will be seen by comparison with the next two Examples 9 and 10.

Example 9

In place of the c.b.m.g. of Examples 1–7, bis(p-dimethylaminophenyl)-m-nitrophenylcarbinol is used. The resulting compound is of no value for purposes of the present invention, being even more sensitive to acid than the c.b.m.g. of Examples 1–7. For purposes of this example, the bis(p-dimethylaminophenyl)-m-nitrophenylcarbinol may be prepared in any desired way, for example, by condensing m-nitrobenzaldehyde with dimethylanaline, followed by oxidation and isolation.

Example 10

Same as example 9, except that p-nitrobenzaldehyde is condensed with dimethylanaline, followed by oxidation and isolation, to produce bis(p-dimethylaminophenyl)-p-nitrophenylcarbinol, which is substituted for the c.b.m.g. in each of the compounds of Examples 1–7. The results are the same as mentioned in connection with Example 9; that is, the resulting compound is of no value, being more sensitive to acid than the c.b.m.g. compound of Examples 1–7.

By comparing Examples 9 and 10 with Example 8, it is seen that the position of the nitro group is of critical importance. When the nitro group is in the ortho position with respect to the carbinol, hydrogen bonding can occur, and excellent results are obtained, the resulting compound being less sensitive to acid than the compounds of the original Examples 1–7. But when the nitro group is in either the meta position or the para position with respect to the carbinol, the resulting compound is more sensitive to acid and useless for purposes of the present invention.

Example 11

2,6-dinitrobenzaldehyde is condensed with dimethylanaline, followed by oxidation and isolation, to produce bis(p - dimethylaminophenyl)2,6 - dinitrotriphenylcarbinol, which is then substituted for the c.b.m.g. in any of the Examples 1–7, or in other words substituted for the bis(p-dimethylaminophenyl)-o-nitrophenylcarbinol in Example 8. The same good results are obtained as in Example 8. In this present Example 11, it is seen that the nitrotriphenylcarbinol contains two nitro groups both in the ortho position with respect to the carbinol, whereas in Example 8 the nitrophenylcarbinol contains one nitro group in the ortho position. Equally good results are obtained in both cases, but the composition of Example 8 is preferred, because the composition of Example 11 is more expensive to prepare.

Example 12 p - Dimethylaminophenyl-p-dimethylamino-o-nitrophenylphenylcarbinol is substituted for the c.b.m.g. in each of Examples 1–7. Again good results are obtained. The nitro group is in the correct position (the ortho position) so that hydrogen bonding can occur, the acid resistance is increased, and the liability to stain and smudging is reduced.

Example 13

Bis(p - dimethylamino-o-nitrophenyl)phenylcarbinol is substituted for the c.b.m.g. in each of Examples 1–7. Both nitro groups are in the correct ortho position, so that again hydrogen bonding can occur, resistance to acid is increased, and improved results are attained.

Example 14

Tris(p-dimethylaminophenyl)methane is nitrated in sulfuric acid, thus producing predominantly bis(p-dimethylaminophenyl) - p - dimethylamino-o-nitrophenylmethane, although smaller quantities of other products may also be produced. The products of this first reaction are then oxidized to form predominantly bis(p-dimethylaminophenyl)-p-dimethylamino-o-nitrophenylcarbinol, which is substituted for the c.b.m.g. in each of Examples 1–7. This also gives good results, as the nitro group is in the correct ortho position, hydrogen bonding can occur, and acid resistance is increased.

Example 15

In any of the foregoing Examples 8, 11, 12, 13, and 14, the methyl group or groups of the color forming material may be replaced by alkyl, aryl, hydrogen, or combinations thereof, without substantial change in the result.

Example 16

Benzaldehyde is condensed with o-nitrodimethylaniline, and the condensation product is oxidized, and the resulting carbinol is isolated, thus producing bis(p-dimethylamino-m-nitrophenyl)-phenylcarbinol. This compound is substituted for the c.b.m.g. in each of Examples 1–7. It gives good results, comparable to those attained by Examples 8 and 11–15, being more resistant to acid and less likely to smudge or stain than the materials of Examples 1–7, but for an entirely different reason than Examples 8 and 11–15. In those last mentioned examples, the improved results apparently flow from the presence of the nitro group in the ortho position. In Example 16, there is no nitro group in the phenylcarbinol part of the compound, but the nitro groups are in the meta position on the rings containing the amino groups, and apparently serve to reduce the basicity of the dimethylamine groups.

Example 17

The color forming material may be the same as in Example 16 except that it may contain three p-amino groups, rather than two, with equally satisfactory results. Also, in both Examples 16 and 17, the methyl in one or more of the amino groups may be replaced by aryl, alkyl, hydrogen, or combinations thereof, without substantially changing the result. Also the compound may contain one, two, or three nitro groups in positions ortho to the amino groups, without substantially changing the results.

As above indicated, any of the compositions of the foregoing Examples 1–8 and 11–17 may be used as the color forming or dye forming material in any duplicating process, whether it be a solid-to-solid process (i.e., impact or pressure transferring some of the composition from an initial sheet on which it is coated to the sheet on which the copy is to be made) or in a spirit duplication or hectograph process (i.e., the composition placed in the desired pattern on the back of a "master" sheet, from which it is transferred in minute quantities to a series or succession of copy sheets brought successively into contact with the back of the master sheet). In either form of duplication, however, a developing agent is needed, which developing agent may be in liquid form at the time it is used, as in the spirit duplicating process, or may be impregnated in the paper or otherwise placed on the paper to leave a dry or substantially dry film of the developing agent thereon, to react with the color forming composition at the time the color forming composition is transferred in the desired pattern to the dry or substantially dry sheet. Essentially, the developing agent must be an acid strong enough to develop the desired color, and yet not so strong as to damage the paper to which it is applied, or to damage the mechanical equipment with which it is used. Examples of satisfactory developing agents will now be given.

Example 18

A developing agent is made up in the following proportions:

| | |
|---|---|
| Isopropyl alcohol | 600 cc. |
| Water | 0 to 60 cc. |
| Oxalic acid (dihydrate) | 5 to 15 grams. |

The oxalic acid is a strong acid, sufficiently strong to develop the desired color even when the color-forming material is quite resistant to acid as in Examples 8 and 11–17. At the same time, the oxalic acid does not corrode copper, brass, zinc, or bronze, the materials most likely to contact with the developing solution in any practical form of apparatus for using the same, as it forms a thin and highly insoluble film with the metals.

Example 19

Same as Example 18, except that 1 to 30 grams of glycerine are added to the same mixture specified in Example 18. The glycerine controls the bleeding of the prints.

Example 20

Other glycols, such as ethylene glycol, or 1,2-propanediol, or 1,3-propanediol may be substituted for the glycerine in Example 19. However, these substitutes do not work as effectively as glycerine, and so the composition of Example 19 is preferred, rather than the substitutes just mentioned.

Example 21

Same as Example 19, plus the addition of 1 to 40 grams of furfuraldehyde. This material acts as a penetrating solvent, making it possible to increase the number of copies which may be run (in a spirit duplicating procedure) from a single master sheet, to the range of about 500 usable copies, as contrasted with only about 50 usable copies when the furfuraldehyde is not included. This developing solution of the present example works not only with the color forming compositions of the present invention, but also with most of the other hectograph color forming systems currently in commercial use and available on the market.

Other aldehydes may be used in place of the furfuraldehyde, but are not preferred because the others have one or more of the following drawbacks, as compared with furfuraldehyde; (1) greater undesirable ordor; (2) more volatile, increasing the fire hazard; (3) become oxidized too easily; and (4) have greater cost.

In Examples 18 through 21, either ethyl alcohol or methyl alcohol may be used in place of isopropyl alcohol, but the results are less satisfactory. It is found that the use of isopropyl alcohol gives a developing solution which is more stable and more satisfactory in use.

Fig. 1 of the drawings is intended to indicate schematically a sheet of paper coated with a color forming composition in accordance with Example 8. Fig. 2 is intended to indicate schematically a sheet of paper coated with a color forming composition in accordance with Example 16. It is believed that no schematic illustration of any of the other examples is needed, the subject matter being entirely clear from the description alone.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A composition of matter adapted for use as a coloring agent for a transfer duplicating process, comprising a mixture of a colorless dye intermediate triphenylcarbinol compound capable of being converted to a colored form by contact with an acid, a wax, an aliphatic primary amine, and finely divided precipitated calcium carbonate, in a minor amount sufficient to assist in transfer of the composition without undesirable dilution thereof.

2. A composition of matter adapted for use as a coloring agent for a transfer duplicating process, comprising a mixture of a colorless dye intermediate triphenylcarbinol compound capable of being converted to a colored form by contact with an acid, a wax, an aliphatic primary amine, di-2-ethylhexylphthalate, and finely divided precipitated calcium carbonate, in a minor amount sufficient to assist in transfer of the composition without undesirable dilution thereof.

References Cited in the file of this patent
UNITED STATES PATENTS

| | | |
|---|---|---|
| 541,572 | Runkel | June 25, 1895 |
| 2,598,660 | Glickman | June 3, 1952 |
| 2,755,201 | Webber | July 17, 1956 |
| 2,755,202 | Balon | July 17, 1956 |
| 2,755,203 | Stallmann | July 17, 1956 |